Patented Jan. 30, 1923.

1,443,935

UNITED STATES PATENT OFFICE.

LOUIS WEISBERG, OF GRANTWOOD, NEW JERSEY, ASSIGNOR TO THE BARRETT COMPANY, A CORPORATION OF NEW JERSEY.

RESINOUS PRODUCT.

No Drawing. Application filed September 24, 1921. Serial No. 503,081.

*To all whom it may concern:*

Be it known that I, LOUIS WEISBERG, a citizen of the United States, residing at Grantwood, in the county of Bergen and State of New Jersey, have invented certain new and useful Improvements in Resinous Products, of which the following is a specification.

This invention relates to new and useful compositions of matter containing resinous products and processes for making the same. The resinous products contained in these compositions are of two separate classes, which are referred to respectively as glycerol-polybasic acid resins and phenol-formaldehyde resins. This invention relates to new and useful combinations of these two classes of resinous products. The industrial utility of these combinations lies in their use in varnishes and in molding and like compositions.

The term glycerol-polybasic acid resins is used to refer to resinous bodies which can be made by heating a polyhydric alcohol either with a polybasic acid of the aromatic series or a polybasic acid of the alifatic series, or both. Most of these resins are made from glycerol and phthalic anhydride and one other acid such as succinic, malic, tartaric, maleic or fumaric acid. According to the amount of the alifatic acid used, products of widely different physical properties are obtained. Thus, without any alifatic acid at all, the product is extremely brittle, while if the proportion of alifatic acid is sufficiently increased, a tough, elastic body is produced. By proper treatment these resins may be rendered substantially inert to water and many ordinary chemicals. By varying the temperature and duration of the heat treatment, the products may be made fusible or infusible and soluble or insoluble, as desired. The term glycerol-polybasic acid resins is used herein to refer not only to those which are made from glycerol or its homologues, as described in co-pending application, Serial No. 432,408, filed December 22, 1920, but also resins made from polyglycerols, as described in co-pending application Serial No. 446,509, filed February 19, 1921.

The term phenol-formaldehyde resins is used to refer to resinous bodies which can be made by heating together phenol and formaldehyde, or their respective derivatives or equivalents, according to known methods. Such products may be made either fusible or infusible, soluble or insoluble, as desired, by those skilled in the art.

Phenol-formaldehyde resins and glycerol-polybasic acid resins have each certain desirable properties which the others lack. By the present invention these materials are combined to produce a result having the better qualities of each component. Thus the glycerol-polybasic acid resins are superior in respect to mechanical strength, toughness, and resistance to shock, while phenol-formaldehyde resins have less tendency to stick in molding. Phenol-formaldehyde resins mold more quickly, and furthermore may be hardened or "cured" by a relatively short heat treatment. Now by mixing these materials in suitable proportions there is obtained a product which has much greater mechanical strength, toughness, and resistance to shock than the phenol-formaldehyde resin alone, and which at the same time frees itself from the mold as readily as the phenol-formaldehyde resin, and which may be hardened more quickly than the glycerol-polybasic acid resin.

In their electrical properties the two classes of resins are comparable and they may, therefore, be mixed to produce materials for use as electrical insulation and the like.

Certain of the glycerol-polybasic acid resins suffer attack when exposed to direct contact with water or aqueous solutions, and these may be rendered substantially inert to water for many practical purposes by admixture with phenol-formaldehyde resins.

In making mixtures of the two kinds of resins the proportions of either component may be varied according to the properties which it is most desired to obtain in the product. Equal proportions by weight of each resin give a combination which is advantageous for many purposes. However, it is to be understood that the scope of this invention is not restricted to any specific proportions, but includes mixtures containing these materials in any proportions whatever. It is to be further understood that this invention includes compositions, which contain fillers and coloring materals, for example, talc, rotten stone, wood flour, asbestos, oxide of iron, oxide of chromium, etc., in addition to a glycerol-polybasic acid resin and a phenol-formaldehyde resin.

It is an important advantage of the resin mixtures herein described that they may be compounded with substantially greater proportions of fillers than are commonly used with the phenol-formaldehyde resins alone, thus making it possible to bring about a material reduction in the cost of certain kinds of electrical insulation.

Various methods of mixing the resins may be employed. When the resins are soluble, they may be mixed by dissolving them in any suitable solvent, such as acetone, alcohol, or ethyl acetate, for example. If the mixture is to be used as a varnish this is especially advantageous, for then the solvent need not be evaporated. When the resins are fusible, they may be melted and thoroughly mixed in the molten condition, but this method is not easily carried out when fillers are to be added. For some purposes the resins and fillers may each be ground separately to a fine powder and then mixed thoroughly. The best method to use when one or both of the resins is infusible is the process of swelling the resins and fillers together by the use of hot acetone, which is described in co-pending application, Serial No. 503,082 filed Sept. 24, 1921.

However, this invention is not limited to any prescribed mode of compounding the resins.

The term "compositions of matter" is used in the appended claims independently of form, shape, or condition and whether molded or not.

I claim:

1. A composition of matter comprising a polyhydric alcohol-polybasic acid resin and a phenol-formaldehyde resin.

2. A composition of matter comprising a glycerol-polybasic acid resin and a phenol-formaldehyde resin.

3. A composition of matter comprising a polyhydric alcohol-polybasic acid resin, a phenol-formaldehyde resin and a filler.

4. A composition of matter comprising a polyhydric alcohol-polybasic acid resin, a phenol-formaldehyde resin, a filler and a solvent.

5. A composition of matter comprising a glycerol-polybasic acid resin, a phenol-formaldehyde resin and a filler.

6. A composition of matter comprising a glycerol-polybasic acid resin, a phenol-formaldehyde resin, a filler and acetone.

In testimony whereof I affix my signature.

LOUIS WEISBERG.